United States Patent Office 2,806,765
Patented Sept. 17, 1957

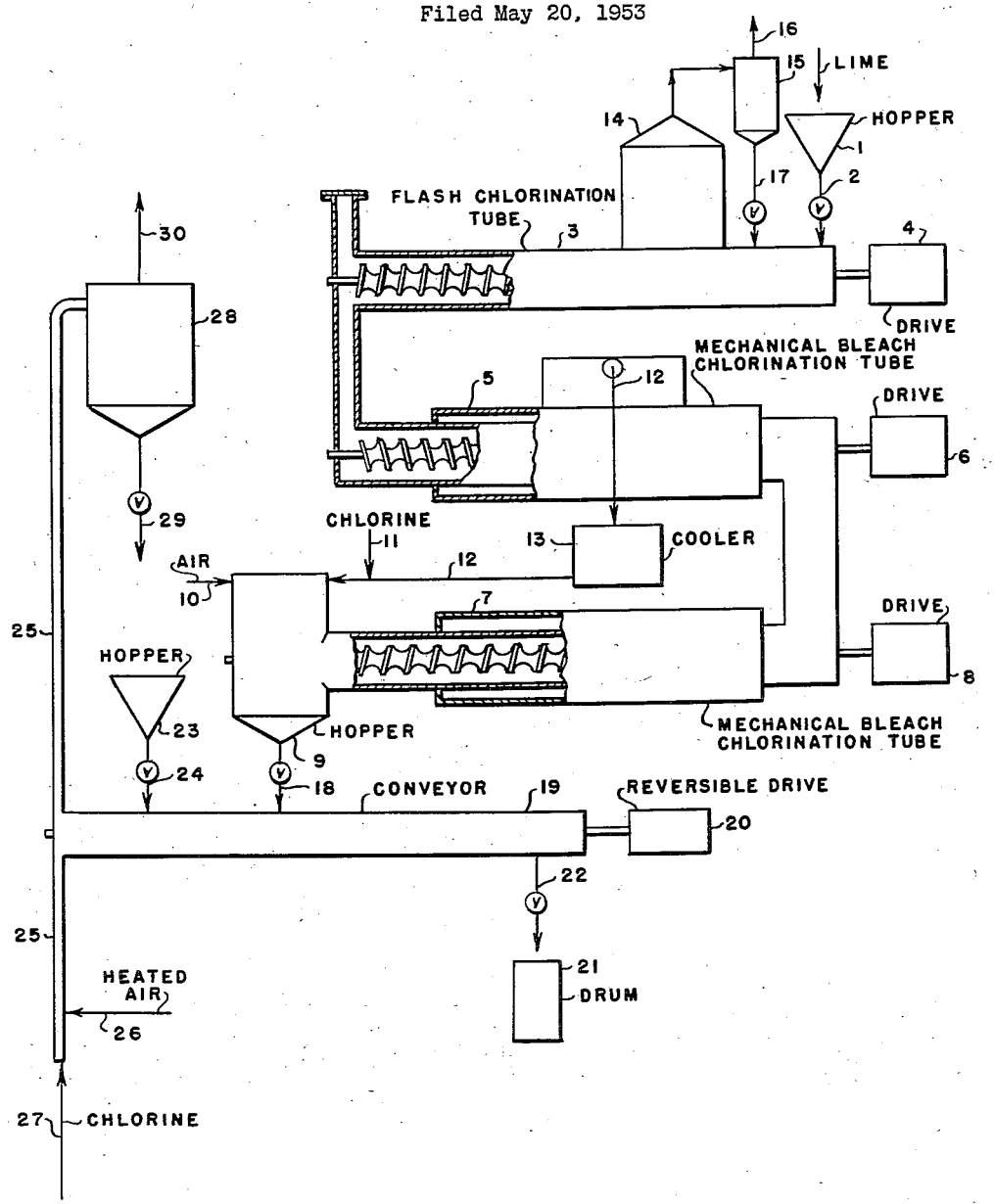

2,806,765
PROCESS FOR PRODUCTION OF BLEACHING POWDER

Homer L. Robson, Lewiston, N. Y., and Alan C. Stoneman, San Marino, Calif.; said Robson assignor to Olin Mathieson Chemical Corporation, a corporation of Virginia, and said Stoneman assignor to Purex Corporation, Ltd., South Gate, Calif., a corporation of California Application May 20, 1953, Serial No. 356,214

8 Claims. (Cl. 23—86)

Our invention relates to a novel method of manufacture of bleaching powder of high available chlorine and low water content.

Bleaching powder is conventionally prepared by exposing moist hydrated lime to a gas, usually air, containing chlorine. Two conventional methods have been widely used. In the "mechanical bleach" process, lime is passed through a series of horizontal tubes, arranged one above the other. Lime is propelled through the top tube, drops to the second tube and is propelled in the opposite direction to a point below the starting place, dropping to the third tube and so on. From five to eight tubes may comprise a mechanical bleach system. Usually air is admitted to the bottom tube and chlorine to the second tube from the bottom, the mixed gases passing upward through the series of tubes, countercurrent to the flow of lime. In this process the tubes may be cooled by water jackets or by means of a water spray. No water is allowed to enter the tubes or to contact the lime in process. The temperature is usually not allowed to exceed about 100° F. Reaction takes place according to the following equation:

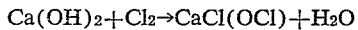

$$Ca(OH)_2 + Cl_2 \rightarrow CaCl(OCl) + H_2O$$

Both the chlorine and the formed water are retained in the product. In this process up to about two-thirds of the lime may be chlorinated to a non-deliquescent, free flowing powder. It is possible to drive the reaction beyond the stage where two-thirds of the lime has reacted but the product is likely to be damp, somewhat deliquescent and of lowered stability on storage. The product of such a process may contain, for example, about 35 to 37 percent of available chlorine and from 12 to 17 percent of water. Such a product cannot be dried, as on heating to a temperature substantially above 100° F., a transition reaction changes the powder to a damp, hygroscopic material which is unstable and corrosive. The transition reaction is not reversible and on cooling the material, it does not return to its original condition. Commercial attempts to dry this bleaching powder have been unsuccessful probably because the formation of the liquid phase permits rapid decomposition.

Other methods of operating the mechanical bleach process have been tried. In one method, for instance, the lime is raked across an upper tray to an opening where it falls to a lower tray, much as in the well known Herreshoff furnace. Here the stream of air and chlorine enters the lower trays and flows upward countercurrent to the lime. A related process is the "Chamber bleach" process in which lime is spread on the floor of a chamber, usually lined with sheet lead, and chlorine and air is passed over it. The temperature is kept below about 100° F. by circulating water in cooling pipes embedded in the floor or by cooling applied to the sheet lead walls.

In the Rudge or Long tube design, the lime enters a single long tube, suitably about 80 feet long and three feet in diameter. This may contain lifts which slowly propel the lime along the tube with a residence time of about 90 to 120 minutes. Chlorine mixed with dry air enters at the discharge end. Cooling is limited to maintain a temperature of about 140° F. or higher. Lime containing some free water is introduced into one end of the tube and is rapidly chlorinated in a flash reaction to an available chlorine content of about 20 to 25 percent. Further chlorination of the lime as it travels through the tube is effected by carefully adjusting humidity conditions. During the flash chlorination at the feed end, most of the water formed by the reaction passes out with the gas stream. If this reaction is allowed to dry the lime completely and if the entering stream of chlorine and air is of low humidity, further chlorination may be inadequate, resulting in a product of low test. With high humidity or otherwise unsuitable conditions, the product may be high in water content. A Rudge tube product usually contains from 3 to 5 percent of water and 29 to 34 percent of available chlorine. The process may be operated to obtain a product which, by treatment with quicklime to remove water, yields a final product having 30 percent of available chlorine and not over 1 percent of water. This is frequently quite difficult to do in the Rudge tube and a compromise between the various factors must be effected. This usually causes some decomposition to occur in the tube and the resulting small amount of liquid phase moistens the partly processed lime, increasing its rate of reaction with chlorine and permits further chlorination.

We have now devised a novel method of manufacturing bleaching powder of high available chlorine and low water content, for example as high as 36 percent available chlorine and as low as 2 percent or less of water, in a series of easily controlled operations. We have found that lime which has been subjected to flash chlorination operated in such a manner that the water content of the product is low, for example, about 1 to 4 percent, and relatively free from the liquid phase can be passed through a conventional mechanical bleach operation and additional chlorine added to as high as 32 to 36 percent depending upon the conditions and time allowed. We have further found that most or all of the water formed in the reaction is added in this second mechanical bleach operation and that it is present as a lattice constituent or in a similar loosely bound form. We have further found that this reaction water may be removed by proper drying conditions because of the prior removal of the reaction water formed during the flash chlorination step which largely avoids the formation of a liquid phase so that decomposition is small and permissible and the water may be removed to a low residual value. Our process thus comprises flash chlorinating lime with dilute chlorine gas in a flash chlorination zone at a temperature of about 125 to 155° F. in which about one-third of the lime reacts with chlorine with removal of most of the water formed by the reaction, subjecting this material to a mechanical bleach chlorination step at a temperature of less than about 100° F. in which up to about one-third more of the lime reacts with retention of part or all of the reaction water formed in this second step and finally drying the resulting material to remove substantially the water formed during the mechanical bleaching chlorination step. In this manner, from about one-half to two-thirds of the lime may be made to react with chlorine with relatively little decomposition of the available chlorine.

Our invention thus provides a novel process for the manufacture of bleaching powder in which chlorine is effectively utilized to produce a bleaching powder of high available chlorine and low water content and of excellent stability which has heretofore been unobtainable. For example, a bleaching powder of 34 to 36 percent available chlorine content and as low as 2 percent water content can be prepared by our process. This bleaching powder can be treated with quicklime to reduce the net water content to about 1 percent to produce a tropical bleach, for example, which is more stable and contains a significantly greater amount of available chlorine than the 28 to 30 percent obtainable with the conventional Rudge process after similar treatment with quicklime.

The process of our invention will be further illustrated by reference to the accompanying drawing which is a simplified flow diagram of a preferred continuous method of operation in which moist hydrated lime is introduced to a flash chlorination zone and passes through this zone and a mechanical bleach chlorination zone to a drying zone with dilute chlorine gas being introduced into the outlet end of the mechanical bleach chlorination zone and passed countercurrently to the direction of the lime flow through the two chlorination zones.

In the drawing, moist hydrated lime is added through hopper 1 and rotary valve 2 to flash chlorination tube 3. The lime is moved by drive 4 along the tube and drops to jacketed tube 5, in which it is moved by drive 6 along the tube, and drops to jacketed tube 7, in which it is moved by drive 8 along the tube to hopper 9. Tubes 5 and 7 are the second or mechanical bleach operation and are equipped with cooling jackets to remove heat of reaction. One tube only may be used or more than two, if desired, for the second step. For example, for a commercial unit of about 10 tons per day output one flash chlorination tube and 4 or 5 second step tubes would be desirable.

Air, adjusted to the desired temperature and humidity, and chlorine are introduced by lines 10 and 11 respectively to tube 7 of the second or mechanical bleach step. The inlet air is preferably at a temperature of about 40 to 50° F. and when mixed with chlorine and recycled gas may be about 60 to 70° F. The air stream contains about 6 to 10 percent chlorine and passes countercurrently to the lime flow in tubes 7 and 5 and on leaving this step passes countercurrently to the lime flow in flash chlorination tube 3. Some gas is returned from a settling chamber in tube 5 by line 12 through cooler 13 to the inlet of tube 7 for temperature control purposes.

The reaction is exothermic and the temperature of chlorination in the flash chlorination step ranges from about 125 to 155° F. although temperatures of about 140° F. are preferred. The lower temperatures are preferred for material which will be stored for a long period of time. The second or mechanical bleach step is maintained at less than about 100° F. and the chlorine and reaction water add together. The exit gas from the flash chlorination tube is at a temperature of about 140° F. and contains about 1½ percent chlorine. The chlorine content of the exit gas stream is advantageously recovered by passing it through settling chamber 14 and cyclone separator 15 to remove dust content. Separated material is returned to tube 3 by line 17. The gas removed by line 16 from the cyclone separator 15 is then scrubbed, cooled and dried and returned to the gas inlet of tube 7 of the second step for reuse. In this way the chlorine content of the effluent gas which might otherwise be wasted is effectively utilized. Moreover, the cooled effluent gas permits better control of temperature in the chlorination reactions.

In the flash chlorination step up to one third of the lime reacts to give a material of a low water content for example, down to about 1 percent, which is relatively free from liquid phase with most of the reaction water being removed in the gas stream. The reaction is limited to one third of the lime to avoid the formation of the liquid phase. This is in marked contrast to the conventional mechanical bleach process in which two thirds of the lime may react. If a liquid phase is formed, we have found that it will evaporate and disappear if the relative humidity of the gas stream is below about 20 percent. We have also found that the chlorination reaction above the one third utilization of the lime stops when the liquid phase is removed by evaporation. The material from the flash chlorination step is then fed to the mechanical bleach step in which the chlorine and reaction water add together. In this way, from about one half to two thirds of lime may be made to react with chlorine with relatively little decomposition of the available chlorine. During the mechanical bleach step, water will add to the bleaching powder if the relative humidity of the air and chlorine stream is over about 25 percent and part of the reaction water will be removed if the relative humidity is under about 20 percent. It is advantageous to remove a portion of the reaction water as formed in the second chlorination step by controlling the relative humidity of the gas stream. The material from the mechanical chlorination step is then subjected to a drying step which removes most of the water. Because of the prior removal of the reaction water formed during the flash chlorination, formation of a liquid phase is largely avoided so that decomposition of the bleaching powder is small and the water may be removed to a low residual value.

In the drying of any calcium hypochlorite material, if hot air is used some hypochlorous acid or chlorine monoxide will pass into the air stream and will thus be lost from the dried solid. We have found that adding a small amount of chlorine, for example, about 0.25 to 1 percent, to the dried air avoids this loss and also advantageously causes some minor addition of chlorine to the bleach. The chlorine may be advantageously recovered in known ways. The drying step may be accomplished with a variety of mechanisms. Tube or tray drying may be used but we prefer a flash drying process in which the powder is briefly contacted with sufficiently heated air to complete the drying in a few seconds, while the powder is suspended in the air stream. Following drying, the powder and air are separated.

For example, in the drawing the powder is removed from tube 7 through hopper 9 and rotary valve 18 to a conveyer 19 equipped with a reversible drive 20. The powder can be sent to drum 21 for storage by line 22 or, with a reversal of motion by the drive, ahead to the flash drying step. Material from the drum 21 can be fed to the flash drying system through hopper 23. Rotary valves 18 and 24 are advantageously provided to seal the inlet to the conveyor from the second chlorination step and from hopper 23. The flash drying is achieved by operating the drive so that the material is pushed into a heated air stream, confined to a small channel 25, so that flow rates of about 3600 to 6000 feet per minute are obtained. Air which has been cleaned, dried and heated is supplied to the channel by line 26. The air is heated to a temperature of about 200° F. and falls to about 140° F. in the collecting mechanism due to evaporation of water. Advantageously, the air is mixed with a small amount of chlorine added through line 27. The channel continues upwards and discharges into cyclone separator 28. In the separator 28 dried bleaching powder is removed by line 29 and air by line 30. The air is scrubbed, dried and reheated for reuse to utilize its chlorine content. Additional collectors, i. e. cyclone separators, may be provided to give adequate holding time for the powder.

In the drying of bleaching powder, the presence of permanent water must be avoided. Permanent water can be considered as water present as calcium chloride monohydrate and cannot be readily removed as it requires a relative humidity of about 1 percent for removal. About one-half of the water present as calcium chloride dihydrate may be removed at a relative humidity of about 7 to 8 percent. The formation of these calcium chloride hydrates should be carefully avoided, for example, by conducting operations in rapid sequence to minimize its formation, so that the bleaching powder may be dried to a low water content. Solution and lattice water may be readily removed at a relative humidity of about 20 percent or at faster rates at slightly lower relative humidities.

The equipment used in our process consists of one relatively small tube for the flash chlorination step, a slightly larger tube, or tubes, for the mechanical bleach chlorination step and a drying mechanism. In previous processes, for example in the Rudge tube design about one cubic foot of reaction space in the tube is required for each two thirds of a pound of lime per hour fed to the tube and frequently more space is desirable due to the slow reaction of chlorine with the liquid phase formed on the decomposing bleaching powder. On the other hand, in our flash chlorination tube one cubic foot of space is sufficient for about 8 to 12 pounds of lime per hour and the utilization of chlorine is markedly better than is possible with a Rudge tube. The mechanical bleach tube requires more space because of the necessity of selecting air flows which will maintain a temperature below the transition point, i. e. about 100° F., of the bleaching powder. A suitable figure for our mechanical bleach tubes is, for example, about one cubic foot of space for about 4 to 6 pounds of lime per hour. A suitable length for the tubes of our process would be about 20 feet or less as compared to about 80 feet for the conventional Rudge tube. In addition, in the Rudge tube process the chlorine concentration in the gas stream is relatively high, e. g. about 10 percent, and leaves the process at about 5 percent concentration. The use of lower chlorine concentrations, e. g. about 6 percent, in our process reduces loss of chlorine during scrubbing and cooling of the exit gas for reuse. Thus, in our process the combined internal volume for the chlorinating tubes is much less than in previous processes and moreover, more effective use of chlorine is obtained.

The process of our invention will be further illustrated by the following example:

Lime was flash chlorinated, subjected to further chlorination in a mechanical bleach operation and then dried. In the flash chlorination step, the feed rate was 42 pounds of lime per hour and 30 pounds of chlorine per hour. The inlet air stream contained about 9 percent of chlorine and the exit stream about 4.3 percent. The exit temperature was 148° F. 16 pounds of chlorine reacted to produce a bleaching powder of 28.4 percent available chlorine and 4.0 percent water. The material was then subjected to a mechanical bleach operation. The chlorine feed rate was 12.5 pounds per hour. The inlet gas contained 6 percent chlorine and the exit gas 3.7 percent. 4.8 pounds of the chlorine reacted to produce a bleaching powder of 34.1 percent available chlorine and 5.0 percent water. The material was then dried by passing air at a temperature of 154° F. into the tube. The exit air temperature was 120° F. Chlorine was mixed with the air in a concentration of 3 percent and the air contained 2.7 percent chlorine at the exit. The feed rate was 113 pounds per hour of air and 8 pounds of chlorine per hour. 0.8 pound of the chlorine reacted. Substantial evaporation resulted. The final product contained 36.5 percent available chlorine and only 3.5 percent of water, which was found to be permanent water.

We claim:

1. A process for the production of bleaching powder of high chlorine and low water content which comprises flash chlorinating moist hydrated lime at a temperature of about 125° to 155° F. with dilute chlorine gas so that about one third of the lime reacts with chlorine, further chlorinating the resulting material with dilute chlorine gas in a mechanical bleach chlorination step at a temperature of less than about 100° F. so that up to about one third more of the lime reacts with chlorine and drying the resulting bleaching powder by contact with hot air to which has been added at least a quantity of chlorine gas effective to prevent the loss of chlorine from the bleaching powder during the drying step and amounting to at least about 0.25 percent.

2. A process for the production of bleaching powder of high chlorine and low water content which comprises flash chlorinating moist hydrated lime at a temperature of about 125° to 155° F. with dilute chlorine gas so that about one third of the lime reacts with chlorine, further chlorinating the resulting material with dilute chlorine gas in a mechanical bleach chlorination step at a temperature of less than about 100° F. so that up to about one third more of the lime reacts with chlorine and drying the resulting bleaching powder by contact with hot air to which has been added about 0.25 to 3 percent of chlorine gas.

3. A continuous process for the production of bleaching powder of high chlorine and low water content which comprises flash chlorinating moist hydrated lime at a temperature of about 125° to 155° F. with dilute chlorine gas so that about one third of the lime reacts with chlorine, removing the resulting material to a mechanical bleach chlorination step, further chlorinating the material with dilute chlorine gas in the mechanical bleach chlorination step at a temperature of less than about 100° F. so that up to about one third more of the lime reacts with chlorine and drying the resulting bleaching powder by contact with hot air to which has been added at least a quantity of chlorine gas effective to prevent the loss of chlorine from the bleaching powder during the drying step and amounting to at least about 0.25 percent, the dilute chlorine gas being introduced into the mechanical bleach chlorination step, passed countercurrently to the direction of the lime flow through the two chlorination steps and spent gas removed.

4. The process of claim 3 in which the removed spent dilute chlorine gas is cleaned, cooled and returned to the mechanical bleach chlorination step.

5. A continuous process for the production of bleaching powder of high chlorine and low water content which comprises flash chlorinating moist hydrated lime at a temperature of about 125° to 155° F. with dilute chlorine gas so that about one third of the lime reacts with chlorine, removing the resulting material to a mechanical bleach chlorination step, further chlorinating the material with dilute chlorine gas in the mechanical bleach chlorination step at a temperature of less than about 100° F. so that up to about one third more of the lime reacts with chlorine and drying the resulting bleaching powder by contact with hot air to which has been added about 0.25 to 3 percent of chlorine gas, the dilute chlorine gas being introduced into the mechanical bleach chlorination step, passed countercurrently to the direction of the lime flow through the two chlorination steps and spent gas removed.

6. The process of claim 5 in which the removed spent dilute chlorine gas is cleaned, cooled and returned to the mechanical bleach chlorination step.

7. A continuous process for the production of bleaching powder of high chlorine and low water content which comprises flash chlorinating moist hydrated lime at a temperature of about 140° F. with dilute chlorine gas so that about one third of the lime reacts with chlorine, removing the resulting material to a mechanical bleach chlorination step, further chlorinating the material with dilute chlorine gas in the mechanical bleach chlorination step at a temperature of less than about 100° F. so that up to about one third more of the lime reacts with chlorine and drying the resulting bleaching powder by contact with hot air to which has been added at least a quantity of chlorine gas effective to prevent the loss of chlorine from the bleaching powder during the drying step and amounting to at least about 0.25 percent, the dilute chlorine gas being introduced into the mechanical bleach chlorination step, passed countercurrently to the direction of lime flow through the two chlorination steps and spent gas being removed, cleaned, cooled and returned to the mechanical bleach chlorination step.

8. A continuous process for the production of bleaching powder of high chlorine and low water content which comprises flash chlorinating moist hydrated lime at a temperature of about 140° F. with dilute chlorine gas so that about one third of the lime reacts with chlorine, removing the resulting material to a mechanical bleach chlorination step, further chlorinating the material with dilute chlorine gas in the mechanical bleach chlorination step at a temperature of less than about 100° F. so that up to about one third more of the lime reacts with chlorine and drying the resulting bleaching powder by contact with hot air to which has been added about 0.25 to 3 percent of chlorine gas, the dilute chlorine gas being introduced into the mechanical bleach chlorination step, passed countercurrently to the direction of lime flow through the two chlorination steps and spent gas being removed, cleaned, cooled and returned to the mechanical bleach chlorination step.

References Cited in the file of this patent

UNITED STATES PATENTS

| | | |
|---|---|---|
| 1,523,847 | Vaughn et al. | Jan. 20, 1925 |
| 1,874,695 | Carughi et al. | Aug. 30, 1932 |
| 1,910,001 | Carughi et al. | May 23, 1933 |
| 1,923,210 | Jaeger | Aug. 22, 1933 |
| 1,945,913 | Remelé | Feb. 6, 1934 |
| 2,032,632 | Renschler et al. | Mar. 3, 1936 |

FOREIGN PATENTS

| | | |
|---|---|---|
| 317,572 | Great Britain | Aug. 22, 1929 |
| 365,019 | Great Britain | Jan. 14, 1932 |
| 375,827 | Great Britain | July 1, 1932 |